United States Patent [19]

Knight

[11] Patent Number: 4,577,517

[45] Date of Patent: Mar. 25, 1986

[54] NEBULIZER

[75] Inventor: Trevor V. Knight, Albany Creek, Australia

[73] Assignee: Labtest Equipment Co. (S.E. Asia) Pty. Ltd., Braeside, Australia

[21] Appl. No.: 609,566

[22] PCT Filed: Aug. 30, 1983

[86] PCT No.: PCT/AU83/00120

§ 371 Date: Apr. 27, 1984

§ 102(e) Date: Apr. 27, 1984

[87] PCT Pub. No.: WO84/00906

PCT Pub. Date: Mar. 15, 1984

[30] Foreign Application Priority Data

Aug. 30, 1982 [AU] Australia .............................. PF5631

Jul. 25, 1983 [AU] Australia .............................. PG0459

[51] Int. Cl.⁴ ............................................ G01N 35/00

[52] U.S. Cl. .................................. 73/864.81; 239/338

[58] Field of Search ............................. 73/863, 864.81; 239/338, 270

[56] References Cited

U.S. PATENT DOCUMENTS

| | | | |
|---|---|---|---|
| 3,385,522 | 5/1968 | Kock . | |
| 3,806,250 | 4/1974 | George | 239/338 |
| 3,929,291 | 12/1975 | Ladisch . | |
| 4,125,225 | 11/1978 | Venghiattis | 239/338 |
| 4,206,160 | 6/1980 | Suddendorf | 239/338 |

FOREIGN PATENT DOCUMENTS

| | | |
|---|---|---|
| 52-110746 | 9/1977 | Japan . |
| 56-76261 | 6/1981 | Japan . |
| 57-19052(A) | 1/1982 | Japan . |
| 57-19052 | 2/1982 | Japan . |
| 1263800 | 2/1972 | United Kingdom . |

*Primary Examiner*—S. Clement Swisher

*Attorney, Agent, or Firm*—Christie, Parker & Hale

[57] ABSTRACT

A nebulizer assembly has an interface (20) at which sample liquid is formed into an aerosol such as by the introduction of a gas at (13). Contamination of the interface is substantially reduced by stopping the production of aerosol and flooding the interface with liquid. The aerosol is supplied to a cloud chamber (22) before analysis. Means are also provided to purge the cloud chamber prior to analysis.

15 Claims, 3 Drawing Figures

NEBULIZER

This invention relates to improvements in and relating to nebulizers and instruments utilizing same and to methods of operating such instruments.

Nebulizers are used in a variety of chemical analysis equipment to transport a liquid sample into various flames, plasmas, etc. whereby selected characteristics of the liquid may be observed. Such instruments include but are not limited to atomic absorption instruments, flame photometers and inductively coupled plasma instruments. There are various types of nebulizers. However common forms utilize pneumatic means or ultra-sonic means to form an aerosol from the sample liquid. In each case the aerosol is contained in a cloud or mist chamber having an outlet arranged to select a fine mist like sample for analysis while the larger size particles, droplets and liquid are directed to a drain at the bottom of the chamber. Furthermore in both the above types of nebulizers the rate of sample uptake remains constant throughout the duration of an analytical sequence, and the means for forming the aerosol, i.e., the gas supply in the case of pneumatic nebulizers, and the electrical energy supplied to the R.F. transducer in the case of ultrasonic nebulizers, also remains constant.

This arrangement has led to operating inaccuracies which result from what are called memory effects whereby an erroneous result may occur due to contamination from the previous sample. This contamination can be due to residual aerosol sample or to residual liquid at the gas/liquid interface in the case of a pneumatic nebulizer, or at the transducer block in the case of an ultrasonic nebulizer. Furthermore in pneumatic nebulizers the calibration of the instrument can change during use as a result of a sample precipitation at the gas/liquid interface. This may be due to local cooling at the gas/liquid interface caused by the constant operation of the instrument whereby the high velocity gas flow at the interface causes a sufficient reduction in temperature to precipitate salts from the sample liquid. This effect is particularly noticeable when testing high concentration solutions and it may result in markedly labourious procedure being adopted in order to achieve acceptable results. At present the means of dealing with the above inaccuracies is to make allowances for same in the test results. This can result, however, in inaccurate results being obtained. Further inaccuracies may result from both long and short term changes in the instrument condition. These inaccuracies may be reduced by the use of an internal standard. In the past the method of using an internal standard has been to introduce a fixed amount of solution, containing a known concentration of a substance, into the liquid sample prior to the introduction to the nebulizer. The instrument would then analyse the liquid sample containing both the unknown substance and the known substance. Any variation in output in respect of the known substance is monitored, and these variations are used to correct for variation in results of the unknown substance.

This procedure is time consuming in that the internal standard needs to be added very accurately to each liquid sample container in turn prior to introduction to the nebulizer. This procedure can lead to errors if care is not taken to ensure that precise amounts of internal standards are added. Additionally, in prior art nebulizers, problems associated with the introduction of dirty or turbid samples can manifest themselves in several ways. For example, the sample introduction tube can become clogged up with deposited precipitated material or all wetted parts can be coated with the suspended or otherwise matter, causing problems with drainage and/or blockages.

One feature of an ultrasonic nebulizer is that, due to its very high nebulization efficiency, desolvation of the aerosol may be necessary before analysis can take place. The desolvation apparatus can have a large volume which will need to be purged in order to reduce memory from one sample to the next. This is a disadvantage in that it increases the analysis cycle time. Attempts have been made in the past to overcome these disadvantages by periodically flushing the interface with a wash solution introduced through an auxilliary inlet, however these attempts have not achieved great practical benefits since it is difficult to remove all contamination once precipitated on the interface and such flushing operations can increase the testing cycle time.

This invention aims to alleviate the disadvantages associated with such prior art apparatus and to provide improved nebulizer assemblies and instruments utilizing same and methods of operating such assemblies which will be reliable and efficient in use. Other objects and advantages of this invention will hereinafter become apparent.

With the foregoing and other objects in view, this invention resides in one apsect in a nebulizer assembly including a sample liquid inlet; an interface to which said sample liquid may be introduced for forming into an aerosol; actuating means co-operable with said interface to form said aerosol and decontamination means operable to substantially reduce contamination of said interface.

Preferable the actuating means is a carrier gas co-operable with the interface to form said aerosol but of course if desired the actuating means may be an ultrasonic transducer block. The carrier gas flow to said interface may be stopped in use either before or after sample testing to stop formation of the aerosol and permit liquid to flush the interface or it may be reduced to prevent the temperature at the interface being lowered to an extent so as to cause precipitation of the solution salts. The flush solution may be provided from a separate inlet for wash solution or alternatively the wash solution or a sample liquid to be tested can be introduced to the interface through the liquid inlet or gas inlet to flood the interface.

Preferably the nebulizer assembly includes a cloud chamber for containing the aerosol and there are provided gas purging means for purging the cloud chamber of aerosol sample. In the case of a pneumatic nebulizer assembly, the purging gas may be diverted from the carrier gas normally supplied to the gas inlet but of course a separate purging gas supply may be utilized if desired. Suitably, the purging gas is introduced to the cloud chamber in such manner that a turbulent flow is created in the cloud chamber in order to remove therefrom as much of the aerosol formed from the previous liquid samples as is possible.

This invention also resides in a further aspect in a method of operating a nebulizer assembly including varying the actuating means to prevent contamination of the interface. Preferably the actuating means is stopped to cause flooding of the interface but a reduction of its aerosol creating effect may be sufficient to prevent contamination of the interface by preventing the temperature at the interface to fall to a degree which causes salt precipitation.

Preferably when operating a pneumatic nebulizer, either before or after sample testing, the gas flow to the interface is stopped and the interface is flushed either with a wash solution or a further sample liquid to be tested. In one embodiment the wash solution is supplied to both the interface and the sample liquid pump.

In order that the present invention may be more readily understood and put into practical effect, reference will now be made to the accompanying drawings which illustrate a preferred embodiment of the invention wherein.

Figure 1:
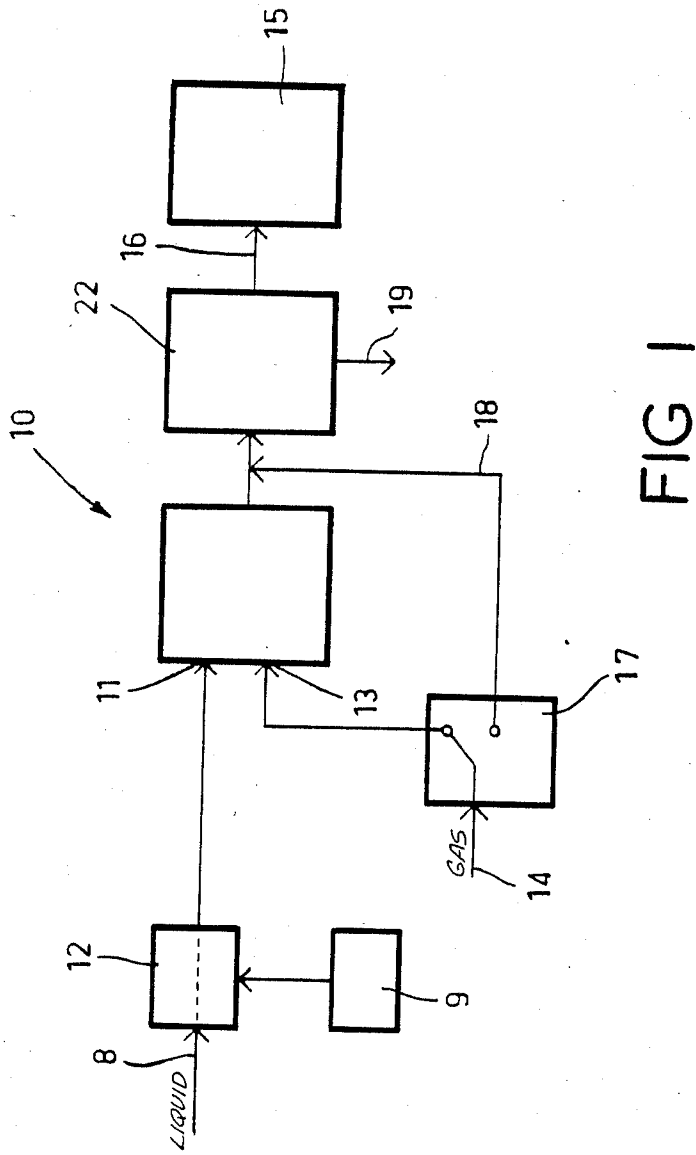
FIG. 1 is a schematic of one embodiment of a testing instrument according to the invention.
Figure 2:
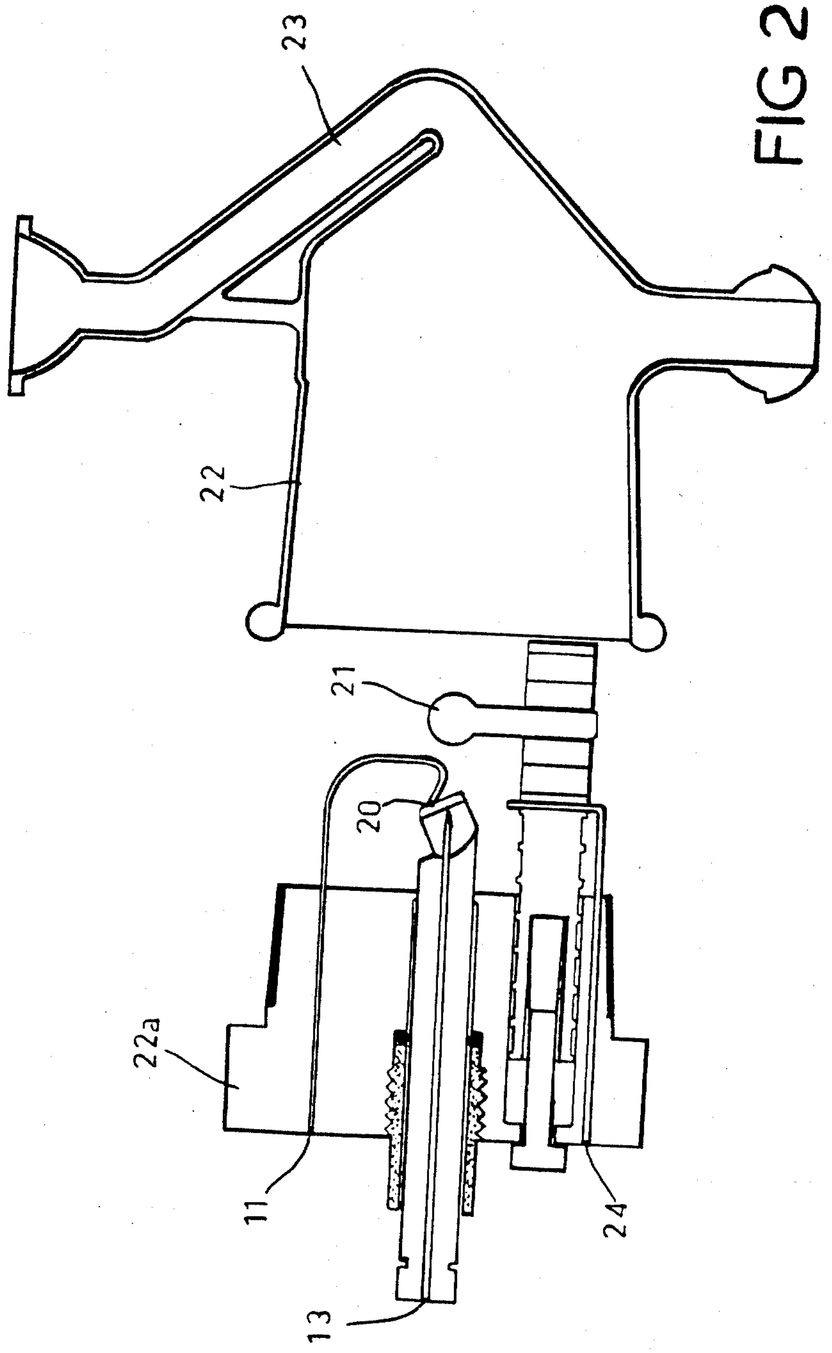
FIG. 2 is an exploded view of a preferred form of pneumatic nebulizer.

Referring to FIG. 1 and FIG. 2, it will be seen that a typical instrument assembly according to this invention includes a pneumatic nebulizer assembly 10 having an inlet 11 for liquid sample 8 supplied from a liquid pump 12, a gas inlet 13 from a gas supply line 14 and testing instrument 15 into which a liquid sample in aerosol form is admitted through an aerosol inlet 16. A two-way valve 17 is provided in the gas supply line 14 and a bypass line 18 directs the gas supply away from the inlet 13 and to the testing instrument 15. A drain 19 for excess liquid sample is provided. A control switch 9 for the pump 12 provides switching for high and low speed operation of the pump 12.

As can be seen in FIG. 2, the nebulizer assembly 10 includes a V-notch gas/liquid interface 20 to which liquid sample is fed and formed into a primary aerosol by the simultaneous introduction of gas from the gas inlet 13. The primary aerosol is further dispersed by being impacted against an impacter bead 21. The cloud or mist so formed by the nebulizer assembly 10 is contained within a cloud chamber 22 which is shown separated from the end cap *22a* with which it engages sealably. The cloud chamber 22 is provided with a circuituous aerosol outlet passage 23 through which the sample aerosol is transferred to the inlet 16 of the testing instrument 15. The outlet drain 19 is provided at the bottom of the cloud chamber 22. The bypass line 18 from the gas valve 17 connects to the auxiliary gas inlet 24 which is so arranged that gas introduced therethrough will swirl about the cloud chamber 22 prior to passage through the outlet passage 23 and purge the cloud chamber of aerosol sample.

In use during analysis of a liquid sample, liquid and gas are supplied to the inlets 11 and 13 respectively in requisite quantities and at suitable pressures to form the aerosol at the gas/liquid interface 20. The aerosol so formed is impacted against the bead 21 and sample aerosol passes to the inlet 16 and to the testing instrument 15. Following and/or before performing an analysis, in order to cleanse the gas/liquid interface 20 and to purge the cloud chamber of residual aerosol so that following analyses will be accurate and not reflect changes in characteristics of the gas/liquid interface due to contamination by the previous sample or "memory effects" due to residual sample, the gas flow to the interface 20 is stopped to prevent further aerosol formation and diverted through the valve 17 to the auxiliary inlet 24 to purge the aerosol from the cloud chamber 22. As a result of stopping the flow of gas to the interface 20, aerosol will not be formed and the interface will be flooded with new liquid sample to decontaminate the interface 20 of old sample and clear away any deposits thereon. The cleansing effect by flooding the interface can be increased by switching the pump 12 into high speed operation. Furthermore, the non-constant operation of the gas supply will assist in maintaining the interface 20 at a sufficiently high-temperature to reduce or prevent precipitation of salts from the sample liquid.

Thus prior to the instrument 15 taking a reading or performing an analysis, the gas valve 17 is operated either manually or automatically to divert the gas flow to the auxiliary inlet 24 in the cloud chamber and at the same time or soon thereafter the switch 9 is operated, either manually or automatically to cause the pump to operate at a higher speed. The gas flow to the auxiliary inlet can be at the same rate or at a different rate to the manual flow to the inlet 13 or if desired an alternate gas supply could be used for purging operations. After a period of time defined by the instrument characteristics, the gas is redirected back through the nebulizer assembly 10 and the pump 12 resumes pumping liquid sample at the rate required for analysis.

Furthermore the frequent flooding of the liquid/gas interface substantially prevents or reduces the build up of precipitated salts to that a more constant operating condition is maintained with the result that time savings may be effected throughout the duration of an analytical sequence and tests results will be improved.

Figure 3:
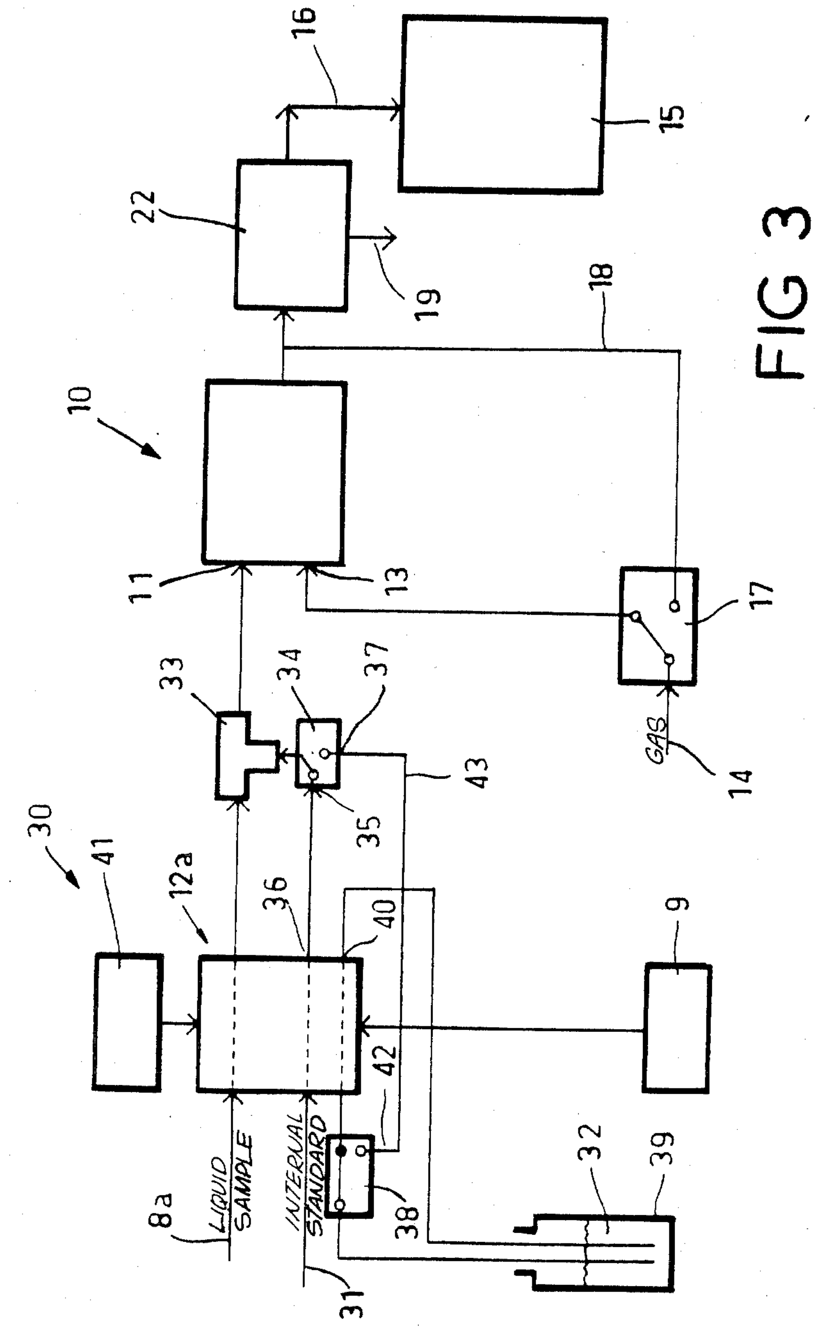
FIG. 3 is a schematic of a further embodiment of testing instrument of the invention.

In the further embodiment of the invention illustrated in FIG. 3, like parts are given like numerals and it will be seen that a modified liquid supply assembly 30 is provided to enable an internal standard liquid to be introduced to the instrument with the sample liquid as well as the supply of a wash solution to both the nebulizer assembly 10 and the supply pump **12*a*. The latter in this embodiment is a reversible positive displacement pump assembly which provides separate reversible pump means for the liquid sample 8*a*, the internal standard solution 31 and the working solution 32. In this embodiment a common pump 12*a*** is used but of course separate pumps could be utilized if desired. Whichever arrangement is used, the output from the wash solution pumping means is greater and preferably twice the output from the liquid sample pumping means.

As shown there is provided a T-piece connector 33 in the supply line to the nebulizer 10 through which the internal standard solution 31 or the wash solution 32 may be introduced. A two-way valve 34 is connected to the T-piece. One inlet 35 to the valve 34 is connected to the output 36 from the pump **12*a* while the other inlet 37 of the valve 34 is connected to the inlet side of the wash solution pump through a further two-way valve 38. During normal forward operation of the pump 12*a* wash solution is recirculated to the holding tank 39 from the outlet 40 of the pump 12*a* and precisely metered quantities of liquid sample and internal standard solutions are mixed together at the T-piece 33 and fed to the nebulizer 10**. The valves are arranged for flow in the direction indicated. This automatic introduction of internal standard alleviates chances of human error and saves time and labour.

After the analysis has been completed the reversing switch 41 is operated and simultaneously the valves 34 and 38 change over. With the pump **12*a* working in reverse and the valves 34 and 38 changed to their alternate positions, wash solution will be fed from the outlet 42 of the valve 38 via the bypass line 43 to the T-piece 33 and since the rate of flow of wash solution to the T-piece is twice the rate of flow from the liquid sample pump means, the wash solution will split at the T-piece and pass through both the liquid sample pump and the nebulizer assembly 10 to flush out both of them to remove any deposited or particulate matter therein. At the same time the valve 17 may be changed to purge the cloud chamber 15**.

In an alternate form a separate pump is used for the wash solution and selected connections from the output thereof wash selected portions of the apparatus, the pump 12*a* may then be of a non-reversible nature. However, it is preferred that it be of a form described above which permits reverse flushing.

It will of course be understood that the above has been given by way of illustrated example only and all such modifications and variations thereto as would be apparent to persons skilled in the art are deemed to fall within the broad scope and ambit of the present invention as defined in the appended claims.

I claim:

1. A nebulizer assembly including a sample liquid Inlet; an interface to which said sample liquid may be introduced for forming into an aerosol; actuating means cooperable with said interface to form said aerosol; decontamination means operable to substantially reduce contamination of said interface; a cloud chamber for containing said aerosol; an aerosol sample outlet from said cloud chamber; and purging means for purging said cloud chamber of said aerosol.

2. A nebulizer assembly according to claim 1, wherein said decontamination means includes control means for said actuating means.

3. A nebulizer assembly according to claim 2, wherein said actuating means is a gas inlet through which gas may be introduced to said interface to form said aerosol and said control means is a valve selectively operable for controlling supply of gas to said gas inlet.

4. A nebulizer assembly according to claim 3, wherein said valve is a diversion valve whereby gas supply diverted from said gas inlet is supplied to said purging means to admit gas to said cloud chamber to purge the latter of sample aerosol.

5. A nebulizer assembly according to claim 1, including a pump assembly for supplying liquid to said liquid inlet.

6. A nebulizer assembly according to claim 5, wherein said pump assembly is a variable output pump assembly.

7. A nebulizer assembly according to claim 5, wherein said pump assembly includes separate pumping means for providing metered quantities of sample liquid and an internal standard solution and interconnection means are provided for introducing said internal standard solution to said liquid inlet with said sample liquid.

8. A nebulizer assembly according to claim 5, wherein said pump assembly further includes pumping means for pumping a wash solution to said interface.

9. A nebulizer assembly according to claim 8, wherein said pumping means for said sample liquid is a positive displacement reversible pump and said pumping means for said wash solution is operable at a greater output than said pumping means for said sample liquid and is adapted to supply wash solution to said interconnection means.

10. A method for nebulizing a sample liquid in a nebulizer having a sample liquid inlet, an interface, actuating means cooperable with the interface, decontamination means with control means for the actuating means, a cloud chamber, and purging means for the cloud chamber, the method comprising the steps of:

introducing the sample liquid to the interface;
forming an aerosol at the interface with the actuating means;
containing the aerosol in the cloud chamber;
purging the cloud chamber with the purging means; and
controlling the actuating means by reducing the actuating means to substantially reduce contamination of the interface.

11. A method for nebulizing a sample liquid in a nebulizer having a sample liquid inlet, an interface, a gas inlet cooperable with the interface to form an aerosol, decontamination means with a valve for selectively controlling supply of gas to the gas inlet, a cloud chamber, and purging means for the cloud chamber, the method comprising the steps of:

introducing the sample liquid to the interface;
forming an aerosol at the interface by introducing gas through the gas inlet to the interface;
containing the aerosol in the cloud chamber;
purging the cloud chamber with the purging means; and
operating the valve to control the supply of gas to the gas inlet.

12. A method according to claim 11, wherein said flushing liquid is introduced through said sample inlet.

13. A method according to claim 11, wherein said flushing liquid is either a wash solution or a sample liquid to be tested.

14. A method according to claim 10 and including the step of introducing a purging gas to said cloud chamber to purge said cloud chamber of sample aerosol.

15. A method according to claim 10 and further including the steps of feeding both a sample liquid to be tested and an internal standard solution to said liquid inlet in accurately preselected proportions.

* * * * *